United States Patent
Kim

(10) Patent No.: US 8,872,484 B2
(45) Date of Patent: Oct. 28, 2014

(54) POWER FACTOR CORRECTION CIRCUITRY AND METHODOLOGY TO COMPENSATE FOR LEADING POWER FACTOR

(75) Inventor: Sangsun Kim, San Jose, CA (US)

(73) Assignee: Google Inc., Mountain View, CA (US)

( * ) Notice: Subject to any disclaimer, the term of this patent is extended or adjusted under 35 U.S.C. 154(b) by 517 days.

(21) Appl. No.: 13/211,998

(22) Filed: Aug. 17, 2011

(65) Prior Publication Data

US 2013/0043847 A1 Feb. 21, 2013

(51) Int. Cl.
  *G05F 1/70* (2006.01)
  *H02M 1/42* (2007.01)
(52) U.S. Cl.
  CPC ............ *H02M 1/4225* (2013.01); *Y02B 70/126* (2013.01)
  USPC ........................................... 323/207; 323/205
(58) Field of Classification Search
  CPC .......................... H02M 1/4225; H02M 1/4208
  USPC ...................... 323/205, 207–211; 363/39, 89; 307/105; 333/19
  See application file for complete search history.

(56) References Cited

U.S. PATENT DOCUMENTS

| | | | |
|---|---|---|---|
| 6,178,101 B1 * | 1/2001 | Shires .............................. | 363/39 |
| 6,982,546 B2 * | 1/2006 | Wu et al. ........................ | 323/205 |
| 7,948,306 B2 * | 5/2011 | Claassen ........................ | 323/207 |

OTHER PUBLICATIONS

"Current Phase Lead Compensation in Single-Phase PFC Boost Converters With a Reduced Switching Frequency to Line Frequency Ratio," Louganski et al., IEEE Transactions of Power Electronics, vol. 22, No. 1, Jan. 2007, pp. 113-119.*
"Active Compensation of the Input Filter Capacitor Current in Single-Phase PFC Boost Converters," Louganski et al., proceedings on 2006 IEEE COMPEL Workshop, Jul. 16-19, 2006, pp. 282-288.*
Kim, Sangsun. "Harmonic Reference Current Generation for Unbalanced Nonlinear Loads", IEEE 34th Annual Power Electronics Specialist Conference, 2003. pp. 773-778.
Chinese Office Action Dated Apr. 25, 2012 for Application Serial No. 20112051379.2; 5 pages.

* cited by examiner

*Primary Examiner* — Adolf Berhane
*Assistant Examiner* — Jye-June Lee
(74) *Attorney, Agent, or Firm* — Fish & Richardson P.C.

(57) ABSTRACT

Aspects relate to utilizing power factor correction to compensate for a leading power factor produced mainly due to electromagnetic interference (EMI) capacitors in front of a power factor correction stage. Provided is a power supply that includes a power factor correction circuit that includes a second harmonic generator component. The harmonic generator component includes a filter component and an integrator component. The filter component is configured to receive a rectified voltage and a power factor correction current and block a direct current component. The integrator component is configured to receive an alternating current component from the filter component and produce a harmonic that causes an angle of the power factor correction current to change from a leading power factor to a unity power factor or to a lagging power factor.

19 Claims, 10 Drawing Sheets

PRIOR ART

POWER FACTOR CORRECTION CIRCUITRY AND METHODOLOGY TO COMPENSATE FOR LEADING POWER FACTOR

TECHNICAL FIELD

The subject disclosure relates to power factor correction and, more particularly, to power factor correction circuitry and methodology to compensate for a leading power factor.

BACKGROUND

Modern telecommunication power systems utilize power supplies to obtain the higher input power necessary to operate electric loads or devices utilized in conjunction with the telecommunication power systems. The electric loads can affect performance of circuits. Thus, power factor of a load is a concern in generation, transmission, distribution, and consumption of electrical power because the power factor can influence both efficiencies and expenses. For example, a power factor that is not at or near unity can increase operating costs and/or device costs (e.g., the increased current and number of hardware components needed to compensate for the non-unity power factor would drive up operating and device costs).

A power factor in an electrical load is defined as the ratio between apparent power applied to the load and actual power absorbed by the load. The power factor is related to phase displacement between current drawn by the load and voltage applied to the load. If the drawn current is in phase with, and has the same waveform as, the applied voltage, the current waveform and voltage waveform are "in phase" and the power factor is equal (or nearly equal) to unity, or "1", and the load is resistive. When the power factor is at or near "1", all (or substantially all) energy supplied by the power source is consumed by the load. A power factor at or near "1" provides energy efficiency advantages. For example, a power factor that is close to unity is desirable in a transmission system in order to reduce transmission losses.

When the load is reactive, the load stores energy and releases the energy during a different portion of the cycle. Such storing and releasing of energy can cause the current waveform to shift such that the current waveform is offset, or "out of phase" with, the voltage waveform. If the voltage waveform and current waveform are out of phase and/or have different waveforms, the power factor can be less than "1". Power factors are generally stated as "leading" or "lagging". For a leading power factor, the current waveform leads the voltage waveform. For a lagging power factor, the current waveform lags the voltage waveform.

Power factor correction is the process of adjusting characteristics of electric loads that create leading or lagging power factors. The adjustment is made in an attempt to bring the power factor at or near unity. In an example, power factor correction attempts to bring the power factor of the alternating current power circuit as close to "1" as possible and can be achieved by supplying reactive power of an opposite polarity or adding components, such as capacitors or inductors, that can operate to cancel inductive or capacitive effects of the load.

Conventional power supplies, such as power supplies rated above a certain power level, can employ a power factor correction circuit, which can cause the power factor correction (PFC) current to be in phase with the line voltage. However, conventional power supplies show a leading power factor due to electromagnetic interference (EMI) capacitors located in front of the PFC. In some instances, the power supply creates a leading power factor, which might not be suitable for use with various devices that cannot support a leading power factor, such as generators. For example, as the generator is used, the power supply that powers the load from the generator can also be creating a leading power factor. Due to the leading power factor, the generator can become out of specification and might malfunction or might need to be shut down to prevent system failures or other problems.

Further, non-linear loads can create harmonic currents that are in addition to the original or supply line alternating current. Techniques, such as filters or active power factor correction have been utilized to smooth out the current demand over each alternating current cycle in order to mitigate the generated harmonic currents. This approach however, can be difficult to implement since simple capacitors or inductors cannot cancel the harmonic circuits currents.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

An aspect relates to a power supply that includes a harmonic generator component. The harmonic generator component includes a filter component configured to receive a rectified voltage and a power factor correction current. The filter component is also configured to block a direct current component. The harmonic generator component also includes an integrator component configured to receive an alternating current component from the filter component. The integrator component is also configured to produce a harmonic that causes an angle of the power factor correction current to change from a leading power factor to a near unity power factor or to a lagging power factor.

Another aspect relates to a method that includes supplying an input voltage and current and producing an output voltage having a leading power factor. The method also includes injecting a harmonic voltage into the output voltage and changing the leading power factor into a near unity power factor or a lagging power factor as a function of injecting the harmonic voltage.

A further aspect relates to a system that includes a power factor boost converter coupled to a power source. The power factor boost converter creates a leading power factor. According to the leading power factor, a current waveform leads a voltage waveform. The system also includes a voltage controller operatively attached to the power factor boost converter. The voltage controller is configured to receive a reference output voltage and an actual output voltage from the power factor boost converter. Also included in the system is a harmonic component operatively attached to the voltage controller. The harmonic component is configured to add a harmonic voltage in the voltage controller to compensate for the leading power factor. The harmonic causes the current waveform to lag the voltage waveform.

These and other implementations are described in more detail below.

BRIEF DESCRIPTION OF THE DRAWINGS

Various non-limiting implementations are further described with reference to the accompanying drawings in which.

DETAILED DESCRIPTION

Figure 1:
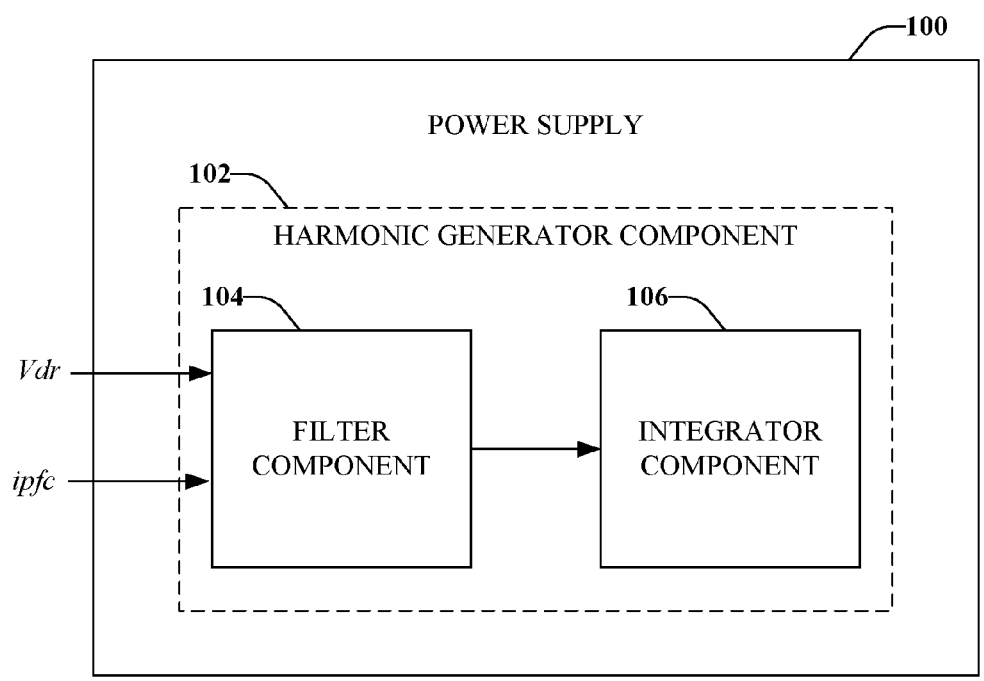
FIG. 1 illustrates an exemplary power supply configured to compensate for a leading power factor, according to an aspect.

Power supplies are generally utilized to supply power to one or more electric devices or loads. However, conventional power supplies that utilize power factor correction can create a leading power factor, which is not suitable for use with various devices, such as generators. Various aspects disclosed herein provide a power supply that creates a unity power factor (e.g., no leading power angle or a zero power angle between the current waveform and the voltage waveform), a near unity power factor (substantially no leading power angle or near zero power angle between the current waveform and the voltage waveform), or a lagging power factor (e.g., the current waveform lags the voltage waveform). The power factor created (zero, near zero, or lagging) can be a function of the load conditions. Also provided herein are methods that compensate for a leading power factor, which can be created by an electromagnetic interference (EMI) filter of a power factor correction (PFC) boost converter or due to other conditions, and are suitable for use with various devices, including generators.

Specifically, as discussed below, a system is provided that includes a power factor boost converter coupled to a power source. A power supply creates a leading power factor, where a current waveform leads a voltage waveform. The system also includes a voltage controller operatively attached to the power factor boost converter. The voltage controller is configured to receive a reference output voltage and an actual output voltage from the power factor boost converter. Also included in the system is a harmonic component operatively attached to the voltage controller and configured to add a harmonic voltage to an output voltage to compensate for the leading power factor. The harmonic voltage causes the current waveform to lag the voltage waveform. In accordance with some aspects, the harmonic component is configured to compensate for the leading power factor by creating a near zero power factor or a lagging power factor as a function of load conditions. In an aspect, the harmonic component is coupled between the power factor boost converter circuit and the voltage controller. Alternatively, according to an aspect, the harmonic component is coupled between the voltage controller and the current controller.

Disclosed herein is a power supply comprising a harmonic generator component that can be operatively coupled between an input source (e.g., an output voltage from an earlier stage of the power supply) and the voltage control component or can be operatively coupled between the voltage control component and the current controller. The harmonic generator component includes a filter component and an integrator component. The filter component is configured to receive a rectified voltage and a power factor correction current. The filter component is also configured to block a direct current component. The integrator component is configured to receive an alternating current component from the filter component and produce a harmonic that causes an angle of the power factor correction current to change from a leading power factor to a unity power factor or to a lagging power factor. In accordance with some aspects, the filter component is configured to pass an alternating current signal of an alternating current instantaneous power to the integrator component. In an aspect, the power supply also includes a voltage control component configured to receive an output voltage and a current controller configured to provide a closed-loop duty ratio; wherein the harmonic generator component is operatively coupled to the voltage control component. In accordance with some aspects, the power supply includes a modification component configured to lower a scaling factor of the harmonic to cause a line current to have a sinusoidal waveform. In some aspects, the integrator component is configured to obtain the harmonic from output power: $V_{2nd} = -V_{out} i_{out} \sin 2\omega t$, where $V_{2nd}$ is the harmonic voltage, $V_{out}$ is the output voltage, $i_{out}$ is the output current, and $\omega$ is an angular frequency of an alternating current line.

Various aspects or features of the subject disclosure have been described with reference to the drawings. In the subject specification, numerous specific details are set forth in order to provide a thorough understanding of the subject disclosure. It may be evident, however, that the disclosed subject matter may be practiced without these specific details, or with other methods, components, materials, and so forth. In other instances, well-known structures and devices are shown in block diagram form in order to facilitate describing the subject disclosure.

Referring initially to FIG. 1, illustrated is an exemplary power supply 100 configured to compensate for a leading power factor, according to an aspect. For example, the power supply can be configured to add a harmonic (sometimes referred to as a second harmonic) into a voltage control of a power factor correction circuit of the power supply. As utilized herein the harmonic or second harmonic indicates twice the frequency of the AC line.

The added harmonic can change a leading power factor into a lagging power factor or into a power factor that is at, or near, unity. For example, before the harmonic is added the current waveform can lead the voltage waveform. However, after the harmonic is added, the current waveform lags the voltage waveform or is in phase with the voltage waveform.

Included in the power supply 100 is a harmonic generator component 102 that includes a filter component 104 and an integrator component 106. The harmonic generator component 102 can be placed in the power supply either before a voltage control stage or after the voltage control stage. The placement of the harmonic generator component can be a function of design considerations, including device size or device layout.

The filter component 104 is configured to receive a rectified voltage, $V_{dr}$, and a power factor correction current, $i_{pfc}$. For example, the rectified voltage, $V_{dr}$, and the power factor correction current, $i_{pfc}$, can be received from a power factor correction circuit associated with the power supply 100, which will be discussed in further detail below. The filter component 104 is also configured to block a direct current component. In accordance with some aspects, the filter component 104 is configured to pass an alternating current signal of an alternating current instantaneous power to the integrator component 106. In some aspects, the filter component 104 is a high pass filter.

The integrator component 106 is configured to receive an alternating current component from the filter component 104, where the direct current component was blocked by the filter component 104. The integrator component 106 is also configured to produce a harmonic that causes an angle of the power factor correction current to change from a leading power factor to a near unity power factor or to a lagging power factor. According to some aspects, the integrator component 106 is configured to obtain the harmonic from output power: $V_{2nd} = -V_{out}i_{out} \sin 2\omega t$, where $V_{2nd}$ is the harmonic voltage, $V_{out}$ is the output voltage, $i_{out}$ is the output current, and $\omega$ is the angular frequency of the AC line.

Figure 2:
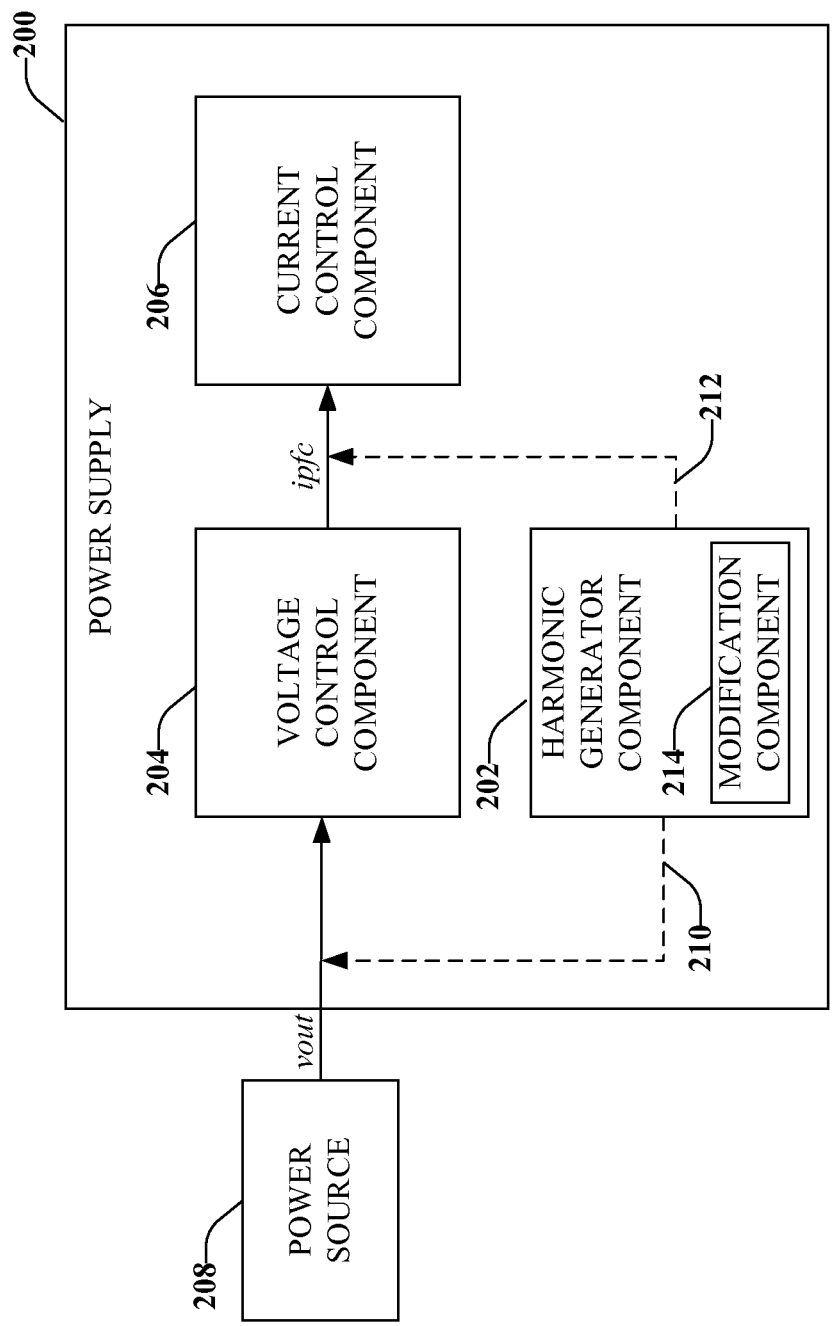
FIG. 2 illustrates another implementation of a power supply, according to an aspect.

FIG. 2 illustrates another implementation of a power supply 200, according to an aspect. Similar to the above figure, power supply 200 includes a harmonic generator component 202. According to an aspect, the harmonic generator component 202 includes a filter component (e.g., filter component 104 of FIG. 1) and an integrator component (e.g., integrator component 106 of FIG. 1). The harmonic generator component 202 is configured to inject a harmonic voltage (e.g., a second harmonic voltage) into an output voltage $V_{out}$.

Also included in power supply 200 is a voltage control component 204 configured to receive the output voltage $V_{out}$ from, for example, a power factor boost converter. A current control component 206 is also included in the power supply 200. The current controller 206 is configured to provide a closed-loop duty ratio. In an aspect, the voltage control component 204 is configured to provide the magnitude of the line current to the current control component 206.

As illustrated, the harmonic generator component 202 is operatively coupled to the voltage controller 204. In accordance with some aspects, the voltage controller 204 is a single proportional integral controller. According to an aspect, the harmonic generator component 202 is operatively coupled between a power source 208 and the voltage controller 204, illustrated by connector 210. In accordance with some aspects, the harmonic generator component 202 is operatively coupled between the voltage controller 204 and the current controller 206, illustrated by connector 212.

In some aspects, a power factor correction current $i_{pfc}$ can be distorted after the harmonic is added. In this case, a modification component 214 is configured to lower a scaling factor of the harmonic created by the harmonic generator component 202. The lowering of the scaling factor can cause a line current to have a sinusoidal waveform.

Figure 3:
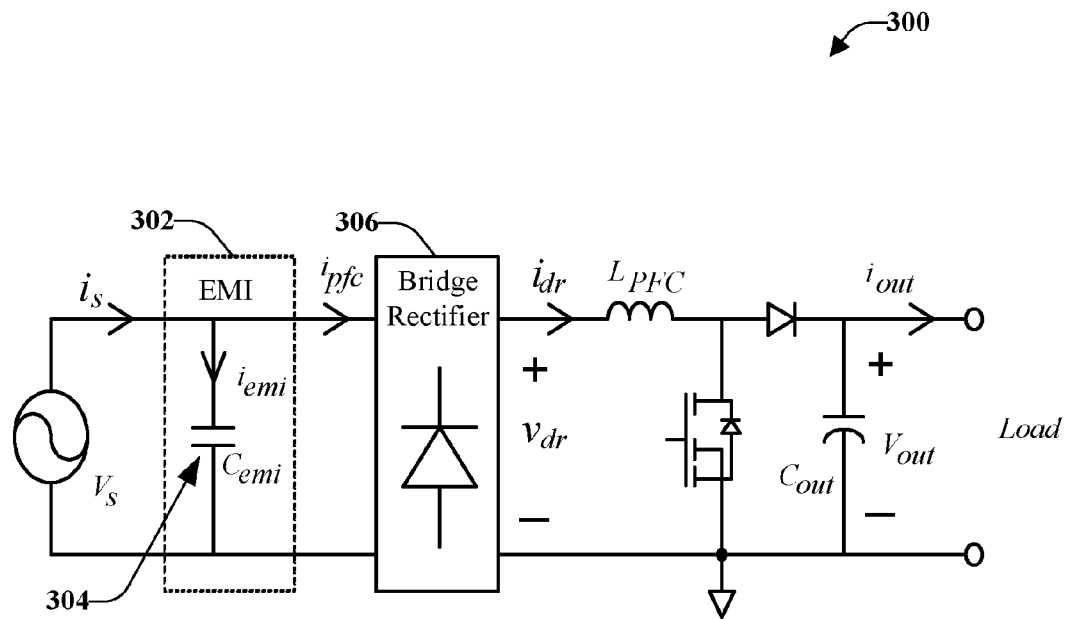
FIG. 3 illustrates an exemplary power factor correction boost converter, which can be included in a power supply unit.

To provide context for the disclosed aspects, FIG. 3 illustrates an exemplary power factor correction (PFC) boost converter 300, which can be included in a power supply unit (PSU) (e.g., power supply 100 of FIG. 1, power supply 200 of FIG. 2). It should be noted that although various topologies can be utilized, including the boost converter and the buck converter. For purposes of simplicity, the boost converter is discussed herein.

The PFC boost converter 300 is configured in such a manner that a leading power factor is created, where the current waveform leads the voltage waveform. As discussed previously, a power supply that creates a leading power factor might not be suitable with some devices or loads (e.g., generators).

Included in the PFC boost converter 300 is an electromagnetic interference (EMI) filter 302 that is coupled across an alternating current (AC) line voltage $V_s$. The AC input line current $i_s$ is divided, at an EMI filter 302, into an EMI current $i_{emi}$ and a PFC current $i_{pfc}$. The EMI filter 302 includes an EMI filtering capacitor $C_{emi}$ 304. The EMI filter 302, in front of the PFC circuit, can include several capacitors and can also include one or more common mode chokes. Common mode chokes can be utilized to help mitigate the amount of EMI from power supply lines and can pass differential currents (of equal value but opposite polarity) while blocking common mode currents. Also included in the PFC boost converter 300 is a bridge rectifier 306 that is coupled in parallel with the EMI filter 302.

Figure 4:
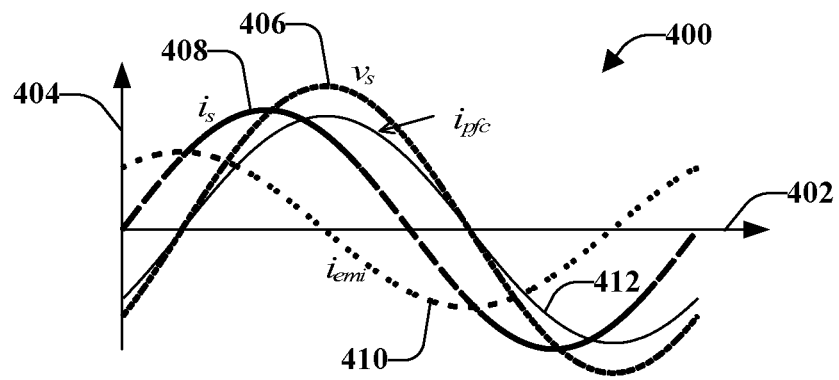
FIG. 4 illustrates a schematic representation of exemplary power supply waveforms that can be produced by the power factor correction boost converter of FIG. 3.

FIG. 4 illustrates a schematic representation of exemplary power supply waveforms 400 that can be produced by the PFC boost converter 300 of FIG. 3. The horizontal axis 402 represents time and the vertical axis 404 represents magnitude. Positive magnitude is represented by the portions of the waveforms above the horizontal axis 402 and negative magnitude is represented by the portions of the waveforms below the horizontal axis 402.

The four different waveforms produced by the PFC boost converter of FIG. 3 are: the AC line voltage, $v_s$, 406, the AC line current, $i_s$, 408, the EMI capacitor current, $i_{emi}$, 410, and the PFC current, $i_{pfc}$, 412. As shown, the AC line current, $i_s$, 408, leads the AC line voltage $v_s$, 406, which is referred to as a leading power factor. As illustrated in FIG. 3, the line current is defined as:

$$i_s = i_{pfc} + i_{emi} \qquad \text{Equation 1.}$$

As can be seen in FIG. 4, the PFC current, $i_{pfc}$, 412, is almost in line with the line voltage, $v_s$, 406, which can be a result of the PFC boost converter 300. However, the EMI capacitor circuit, $i_{emi}$, 410, causes the line current, $i_s$, 408, to lead the line voltage $v_s$, 406, which, as previously mentioned might not be suitable for use with some devices.

Figure 5:
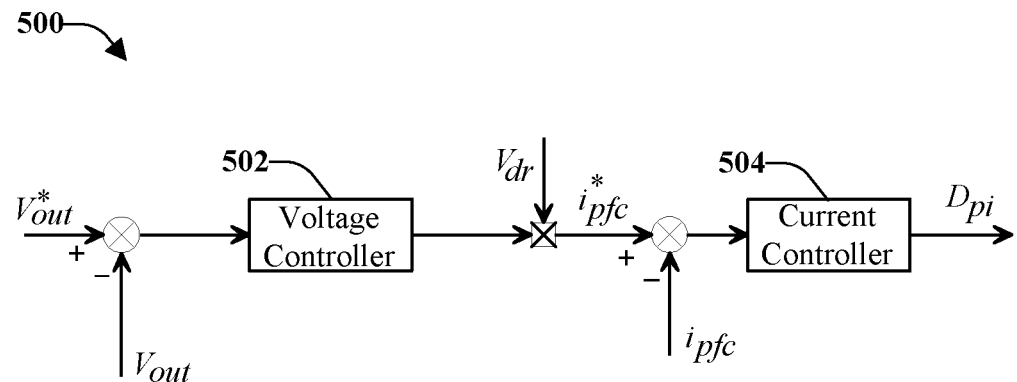
FIG. 5 illustrates a power factor correction control block diagram that does not compensate for a leading power factor.

FIG. 5 illustrates a power factor correction (PFC) control block diagram 500 that does not compensate for a leading power factor. As shown, the PFC control block diagram 500 comprises an inner current control loop and an outer voltage loop. A power supply with this type of PFC control shows a leading power factor mainly due to EMI capacitors in front of the PFC.

A voltage controller 502 is configured to maintain a voltage output, $V_{out}$, at a constant or near constant voltage level. The "*" means a complex conjugate. An output of the voltage controller 502 can contain harmonics, which can be sinusoidal in nature. A rectified voltage, $V_{dr}$, which can be considered a disturbance, is added into the circuit. The power factor correction current, $i_{pfc}$, is controlled by a current controller 504. The closed-loop duty ratio, $D_{pi}$, which contains a small amount of variations, depending on load conditions, is obtained from the current controller 504. The PFC control block diagram 500 illustrated does not compensate for a leading power factor, and, therefore, might not be suitable for all loads.

Figure 6A:
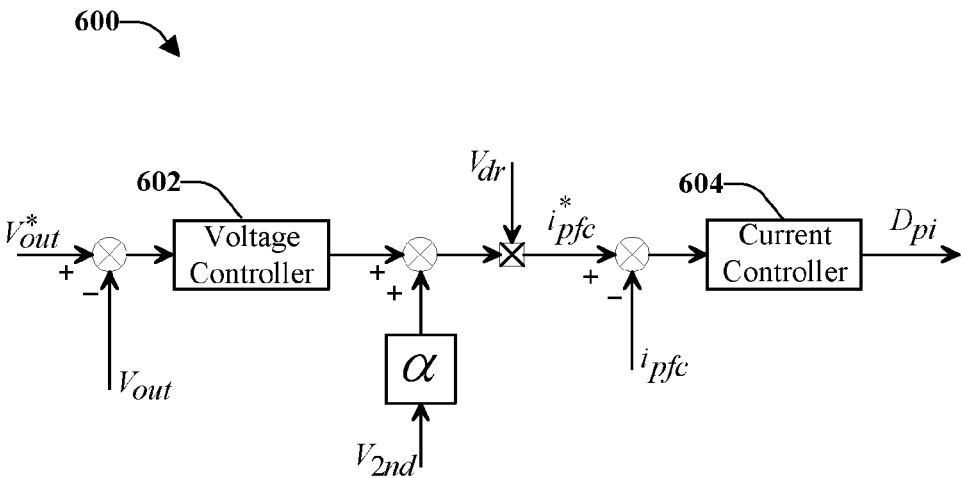
FIG. 6A illustrates a first implementation of a power factor correction control block diagram configured to compensate for a leading power factor, according to an aspect.

FIG. 6A illustrates a first implementation of a PFC control block diagram 600 configured to compensate for a leading power factor, according to an aspect. As illustrated, similar to FIG. 5, a voltage controller 602 is configured to maintain a voltage output, $V_{out}$, at a constant or near constant voltage level and, therefore, performs voltage control. The voltage controller 602 is configured to receive a reference output voltage $V^*_{out}$ and an actual output voltage $V_{out}$. The rectified voltage, $V_{dr}$, is added into the circuit and a power factor correction current, $i_{pfc}$, and reference power factor correction current $i^*_{pfc}$ is added and input into a current controller 604. For example, the voltage controller 602 can determine a magnitude of the line current and provide the information related to the magnitude of the line current to the current controller 604. The closed-loop duty ratio, $D_{pi}$, is obtained from the current controller 604. This first implementation of the PFC control block diagram 600 compensates for a leading power factor, by the introduction of a second harmonic component, $V_{2nd}$, after voltage control. The "α" represents a scaling factor. In accordance with some aspects, the scaling factor is implemented by another controller, such as a proportional-integral (PI) controller, or a compensator, or another component that can provide the scaling factor. Thus, the second harmonic component is operatively connected between the voltage controller 602 and the current controller 604 in this implementation.

Figure 6B:
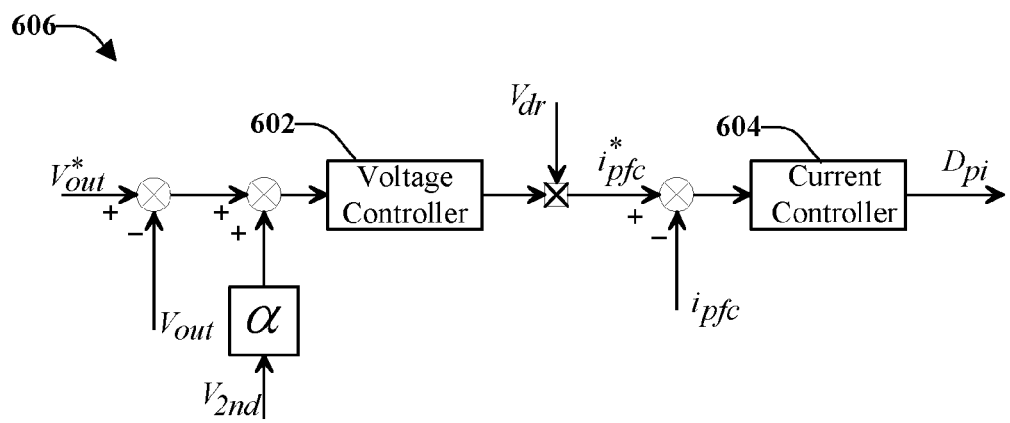
FIG. 6B illustrates a second implementation of a power factor correction control block diagram configured to compensate for a leading power factor, according to an aspect.

According to a second implementation of a PFC control block diagram 606, illustrated in FIG. 6B, the second harmonic component, $V_{2nd}$, can be added in the circuit before voltage control. Thus, in this implementation, the second harmonic component is operatively connected between the voltage source (e.g., an earlier stage of the power supply that produces an output voltage having a leading power factor) and the voltage controller 602. The location of the second harmonic component does not affect the PFC current. For example, the PFC current is substantially the same whether the second harmonic component is placed in front of the voltage controller 602 or after the voltage controller. By injecting the second harmonic component, $V_{2nd}$, into the voltage control of PFC, the power supply can turn the leading power factor into a lagging power factor. In accordance with some aspects, the power supply can turn the leading power factor into unity or near unity (e.g., zero or almost zero) power factor.

As discussed, the second harmonic can be added either before or after the voltage controller of PFC. The second harmonic can be obtained in several different manners. According to an aspect, the second harmonic can be obtained where only the AC component of AC input instantaneous power is passed and an integrator produces the second harmonic. In accordance with another aspect, another manner of obtaining the second harmonic is from output power:

$$V_{2nd} = -V_{out} i_{out} \sin 2\omega t \qquad \text{Equation 2.}$$

Where $V_{2nd}$ is the harmonic voltage, $V_{out}$ is the output voltage, $i_{out}$ is the output current, and ω is the angular frequency of the AC line.

Figure 7:
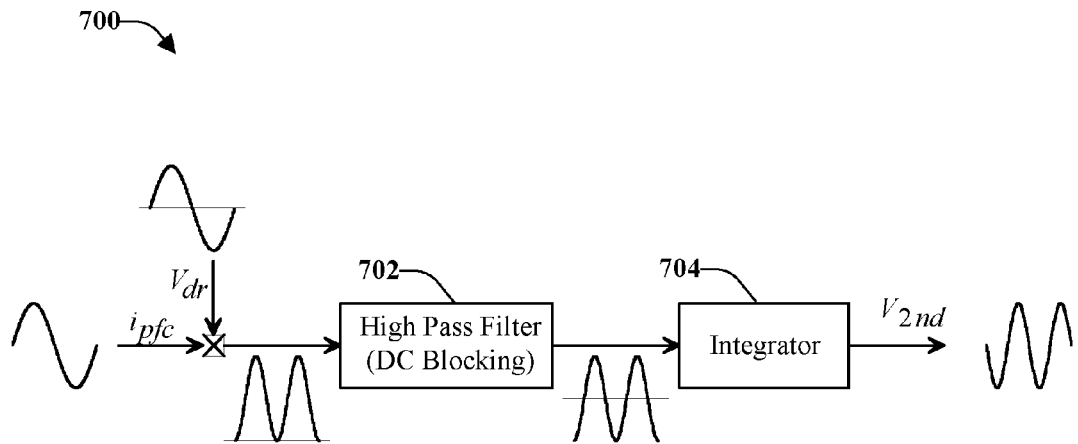
FIG. 7 illustrates a second harmonic generator, according to an aspect.

For example, as illustrated by the second harmonic generator 700 of FIG. 7, a rectified voltage, $V_{dr}$, and a PFC current, $i_{pfc}$, both having sinusoidal waveforms, are input to a high pass filter 702. The high pass filter 702 can be configured to block a direct current, according to an aspect. An integrator 704 is configured to change an angle of the waveform. According to some aspects, the integrator 704 is configured to phase shift the current waveform, such as by shifting the waveform to the left, which causes the current waveform to lag the voltage waveform or to be in phase (or nearly in phase) with the voltage waveform.

Figure 8:
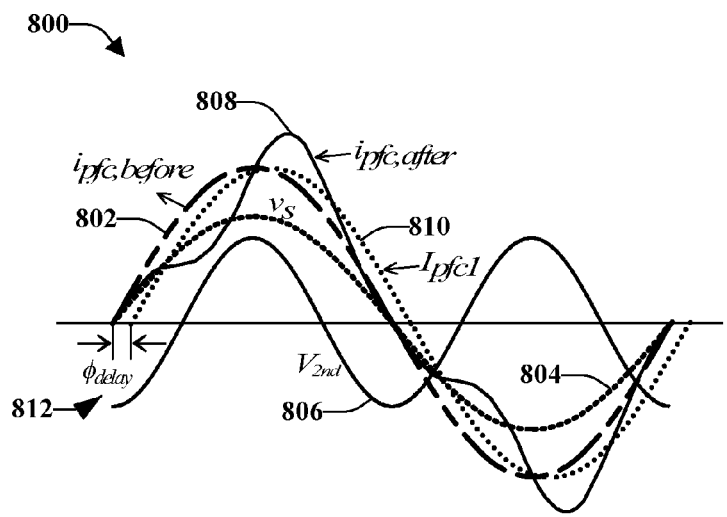
FIG. 8 illustrates exemplary power factor correction current waveforms before and after adding a second harmonic, according to an aspect.

FIG. 8 illustrates exemplary PFC current waveforms 800 before and after adding the second harmonic, according to an aspect. As shown, the PFC current, $i_{pfc,before}$, 802, is in phase with the line voltage, $v_s$, 804, before the second harmonic, $V_{2nd}$, 806, is added in the control block diagram. After adding the second harmonic, $V_{2nd}$, 806, the PFC current, $i_{pfc,after}$, 808, is distorted but the fundamental PFC current, $I_{pfc1}$, 810, is delayed by $\phi_{delay}$ 812. The overall AC line current, after adding the EMI capacitor current, may lag the line voltage or, in some aspects, the power angle between AC voltage and current is very close to zero.

Figure 9:
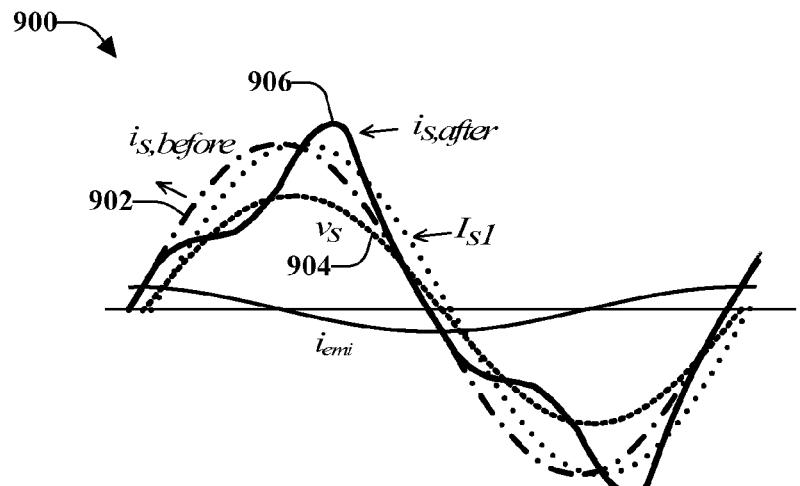
FIG. 9 illustrates exemplary line current waveforms before and after adding the second harmonic, according to an aspect.

FIG. 9 illustrates exemplary line current waveforms 900 before and after adding the second harmonic, according to an aspect. As shown, the line current, $i_{s,before}$, 902, is in phase with the line voltage, $v_s$, 904. After the second harmonic is added, the line current, $i_{s,after}$, 906, is distorted. If the line current distortion is of concern, the line current can be more brought closer to a sinusoidal waveform by lowering the scaling factor α of the second harmonic (e.g., though feedback control).

Figure 10:
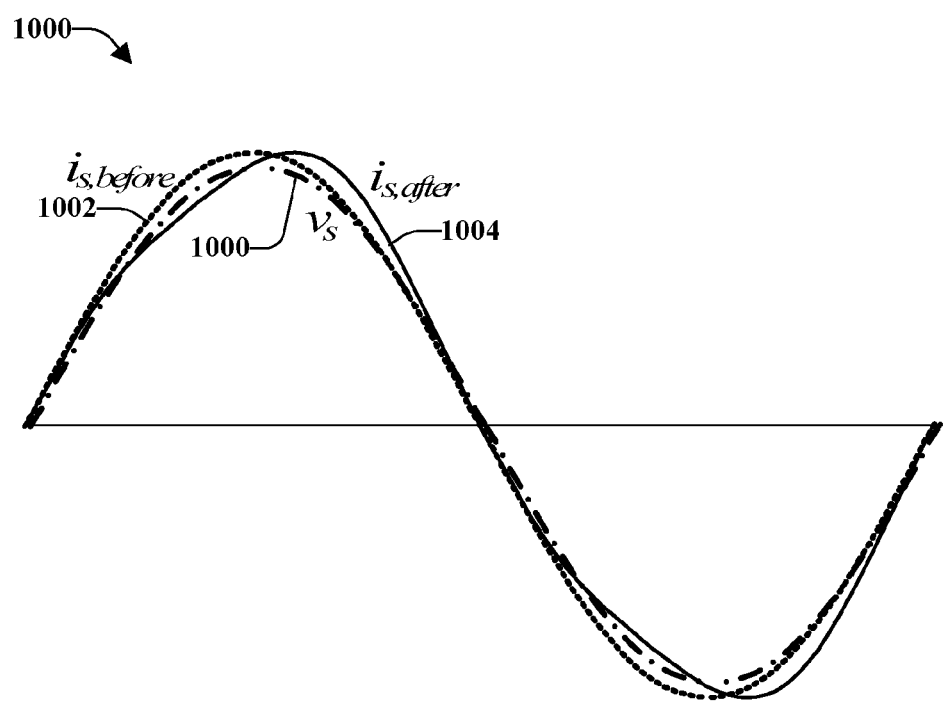
FIG. 10 illustrates an example alternating current line voltage waveform and current waveform, in accordance with an aspect.

FIG. 10 illustrates example AC line voltage waveform and current waveforms, in accordance with an aspect. Shown are waveforms for the source voltage, $v_s$, 1000. Also show are the line current before the second harmonic is added, $i_{s,before}$, 1002, (leading power factor) and the current after the second harmonic is added, $i_{s,after}$, 1004 (lagging power factor). As shown, the AC power factor of the power supply becomes lagging or close to zero.

Figure 11:
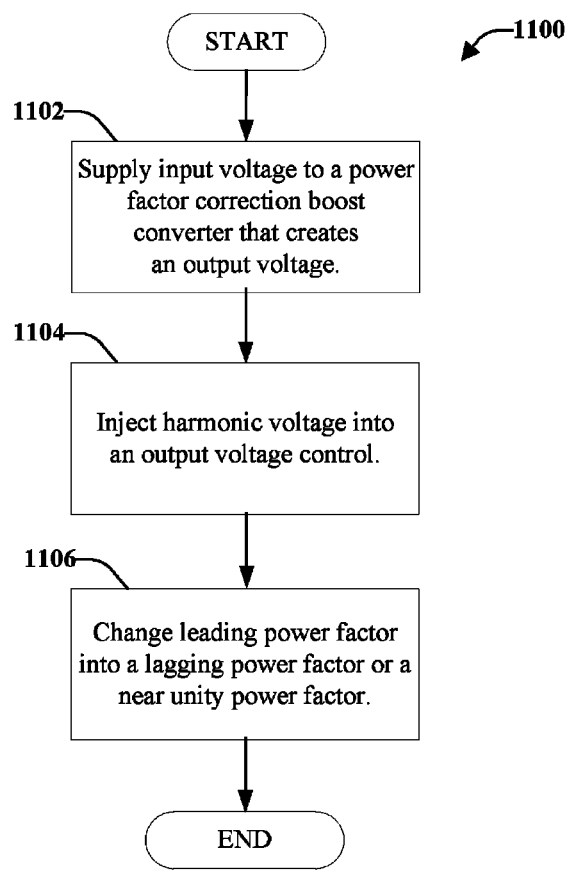
FIG. 11 illustrates a method that compensates for a leading power factor, according to an aspect.

FIG. 11 illustrates a method 1100 that compensates for a leading power factor, according to an aspect. Method 1100 is configured to change an angle of a current waveform that is leading a voltage waveform into a current waveform that is lagging or that is substantially in unity with the voltage waveform.

Method 1100 starts, at 1102, when an input voltage is supplied to a power factor correction boost converter. The output voltage is regulated by a PFC converter. At 1104, a harmonic voltage is injected into an output voltage controller. In accordance with some aspects, injecting the harmonic voltage includes adding the harmonic voltage before applying voltage control to the output voltage. According to other aspects, injecting the harmonic voltage includes adding the harmonic voltage after applying voltage control to the output voltage. At 1106, the leading power factor is changed into a near unity power factor or a lagging power factor as a function of the injecting the harmonic voltage.

Figure 12:
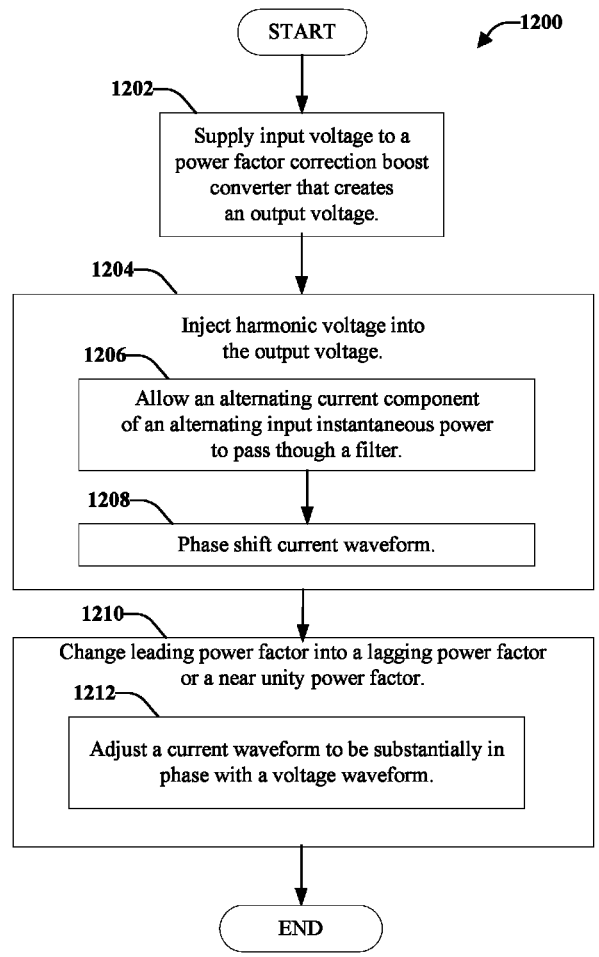
FIG. 12 illustrates another method that compensates for a leading power factor, according to an aspect.

FIG. 12 illustrates another method that compensates for a leading power factor, according to an aspect. At 1202, an input voltage is supplied to a power factor correction boost converter or to a different type of converter. The power factor correction boost convertor can produce an output voltage having a leading power factor. At 1204, a harmonic voltage is injected into the output voltage (or to an output voltage controller). In accordance with some aspects, injecting the harmonic voltage can include filtering an alternating current signal of an alternating input instantaneous power, at 1206. A current waveform is phase shifted, at 1208, to change an angle of the current waveform to facilitate changing the power factor.

At 1210, in accordance with some aspects, a leading power factor is changed into a lagging power factor or a near unity power factor. In accordance with some aspects, changing the leading power factor includes adjusting, at 1212, a current waveform to be substantially in phase with a voltage waveform.

Figure 13:
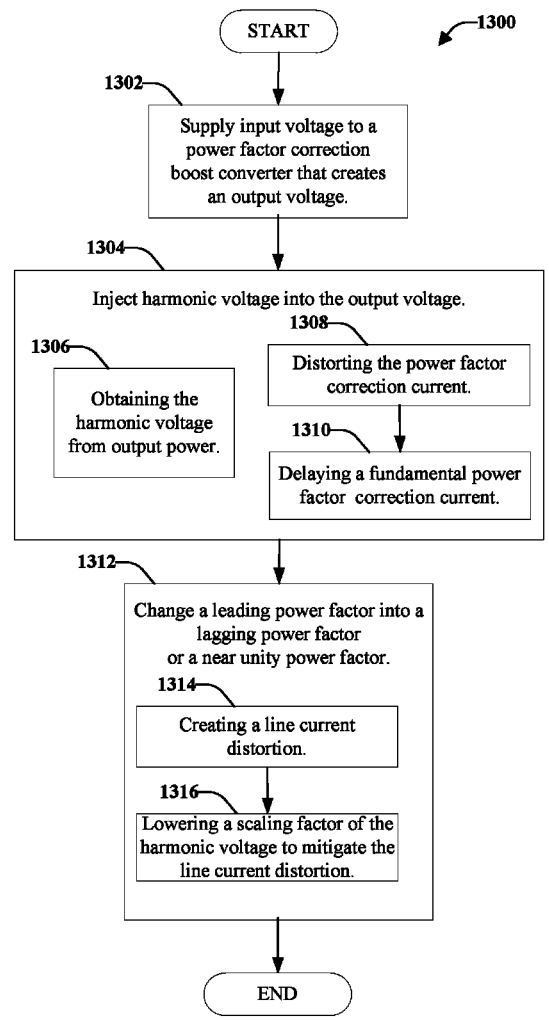
FIG. 13 illustrates yet another method for performing power factor correction to compensate for a leading power factor, according to an aspect.

FIG. 13 illustrates another method for performing power factor correction to compensate for a leading power factor, according to an aspect. At 1302, an input voltage is supplied to a power factor correction boost converter and an output voltage having a leading power factor is produced. A harmonic voltage is injected into the output voltage controller, at 1304. According to an aspect, injecting the harmonic voltage includes, at 1306, obtaining the harmonic voltage from output power: $V_{2nd} = -V_{out} i_{out} \sin 2\omega t$, where $V_{2nd}$ is the harmonic voltage, $V_{out}$ is the output voltage, $i_{out}$ is the output current, and $\omega$ is an angular frequency of an alternating current line.

In accordance with some aspects, a power factor correction current is in phase with a line voltage. Further to this alternative aspect, the method includes distorting the power factor correction current, at 1308, and delaying a fundamental power factor correction current, at 1310.

At 1312, the leading power factor is changed into a near zero power factor or a lagging power factor as a function of injecting the harmonic voltage. In accordance with some aspects, changing the leading power factor includes creating a line current distortion, at 1314, and lowering a scaling factor of the harmonic voltage to mitigate the line current distortion, at 1316.

Reference throughout this specification to "one aspect", "an aspect", or the like means that a particular feature, structure, or characteristic described in connection with the aspect is included in at least one aspect. Thus, the appearances of the phrase "in one aspect", "in an aspect", or the like in various places throughout this specification are not necessarily all referring to the same aspect. Furthermore, the particular features, structures, or characteristics may be combined in any suitable manner in one or more aspects.

As used in this application, the terms "component" "system," or the like are generally intended to refer to a computer-related entity, either hardware (e.g., a circuit), a combination of hardware and software, software, or software in execution or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Further, the word "coupled" is used herein to mean direct or indirect electrical or mechanical coupling.

The systems and processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not illustrated herein.

In view of the exemplary systems described above, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

What has been described above includes examples of the implementations of the disclosed aspects. It is, of course, not possible to describe every conceivable combination of components or methods for purposes of describing the claimed subject matter, but it is to be appreciated that many further combinations and permutations of the disclosed aspects are possible. Accordingly, the claimed subject matter is intended to embrace all such alterations, modifications, and variations that fall within the spirit and scope of the appended claims. Moreover, the above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing some of the acts and/or events of the various methods of the claimed subject matter.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the disclosed aspects may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A power supply, comprising:
 a harmonic generator component, comprising:
  a filter component configured to receive a rectified voltage and a power factor correction current and configured to block a direct current component; and
  an integrator component configured to receive an alternating current component from the filter component and configured to produce a harmonic that causes an angle of the power factor correction current to change from a leading power factor to a near unity power factor or to a lagging power factor.

2. The power supply of claim 1, wherein the filter component is configured to pass an alternating current signal of an alternating current instantaneous power to the integrator component.

3. The power supply of claim 1, further comprising:
 a voltage control component configured to receive an output voltage and provide a magnitude of a line current to a current control component; and
 the current control component configured to provide a closed-loop duty ratio,
 wherein the harmonic generator component is operatively coupled to the voltage control component.

4. The power supply of claim 3, wherein the harmonic generator component is operatively coupled between an input source and the voltage control component.

5. The power supply of claim 3, wherein the harmonic generator component is operatively coupled between the voltage control component and the current control component.

6. The power supply of claim 1, further comprising a modification component configured to lower a scaling factor of the harmonic to cause a line current to have a sinusoidal waveform.

7. The power supply of claim 1, wherein the integrator component is configured to obtain the harmonic from output power by using equation: $V_{2nd}=-V_{out}i_{out}\sin 2\omega t$, where $\omega$ is an angular frequency of an alternating current line, $V_{out}$ is an output voltage of the output power, $i_{out}$ is an output current of the output power, and $V_{2nd}$ is the harmonic.

8. A method, comprising:
 supplying input voltage and current;
 producing an output voltage having a leading power factor;
 injecting a harmonic voltage into the output voltage; and
 changing the leading power factor into a near zero power factor or a lagging power factor as a function of the injecting the harmonic voltage,
 wherein injecting the harmonic voltage comprises:
  filtering an alternating current component of an alternating input instantaneous power; and
  phase shifting a current waveform related to the filtered component to change an angle of the current waveform to facilitate the changing the leading power factor.

9. The method of claim 8, wherein a power factor correction current is in phase with a line voltage and wherein the injecting the harmonic voltage comprises:
 distorting the power factor correction current; and
 delaying a fundamental power factor correction current.

10. The method of claim 8, wherein the changing the leading power factor comprises adjusting a current waveform to be substantially in phase with a voltage waveform.

11. The method of claim 8, wherein the injecting comprises adding the harmonic voltage after applying voltage control to the output voltage.

12. The method of claim 8, wherein the changing the leading power factor comprises creating a line current distortion.

13. A method, comprising:
 supplying input voltage and current;
 producing an output voltage having a leading power factor;
 injecting a harmonic voltage into the output voltage, wherein the injecting comprises obtaining the harmonic voltage from the output voltage and an output current by using the equation $V_{2nd}=-V_{out}i_{out}\sin 2\omega t$, where $V_{2nd}$ is the harmonic voltage, $V_{out}$ is the output voltage, $i_{out}$ is the output current, and $\omega$ is an angular frequency of the input current; and
 changing the leading power factor into a near zero power factor or a lagging power factor as a function of the injecting the harmonic voltage.

14. A method, comprising:
 supplying input voltage and current;
 producing an output voltage having a leading power factor;
 injecting a harmonic voltage into the output voltage, wherein the injecting comprises adding the harmonic voltage before applying voltage control to the output voltage; and
 changing the leading power factor into a near zero power factor or a lagging power factor as a function of the injecting the harmonic voltage.

15. A method, comprising:
 supplying input voltage and current;
 producing an output voltage having a leading power factor;
 injecting a harmonic voltage into the output voltage;
 changing the leading power factor into a near zero power factor or a lagging power factor as a function of the injecting the harmonic voltage, wherein changing the leading power factor comprises creating a line current distortion; and
 lowering a scaling factor of the harmonic voltage to mitigate the line current distortion.

16. A system, comprising:
 a power factor boost converter coupled to a power source, wherein the power factor boost converter creates a leading power factor, in which a current waveform leads a voltage waveform;
 a voltage controller operatively attached to the power factor boost converter and configured to receive an output voltage from the power factor boost converter; and
 a harmonic component operatively attached to the voltage controller and configured to add a harmonic voltage to the output voltage to compensate for the leading power factor, wherein the harmonic voltage causes the current waveform to lag the voltage waveform, the harmonic component comprising:
  a filter component configured to receive a rectified voltage and a power factor correction current and configured to block a direct current component; and
  an integrator component configured to receive an alternating current component from the filter component and configured to produce the harmonic voltage, the harmonic voltage causing an angle of the power factor correction current to change from a leading power factor to a near unity power factor or to a lagging power factor.

17. The system of claim 16, wherein the harmonic component is configured to compensate for the leading power factor by creating a near zero power factor or a lagging power factor as a function of load conditions.

18. The system of claim 16, wherein, the harmonic component is coupled between the power factor boost converter and the voltage controller.

19. The system of claim 16, wherein the harmonic component is coupled between the voltage controller and a current controller.

* * * * *